(12) United States Patent
Hoehenberger

(10) Patent No.: US 12,164,039 B2
(45) Date of Patent: Dec. 10, 2024

(54) WIND DETECTION SYSTEM AND VEHICLE CONTROL

(71) Applicant: TEXAS INSTRUMENTS INCORPORATED, Dallas, TX (US)

(72) Inventor: Jonas Hoehenberger, Kissing (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 835 days.

(21) Appl. No.: 17/113,348

(22) Filed: Dec. 7, 2020

(65) Prior Publication Data

US 2022/0179096 A1 Jun. 9, 2022

(51) Int. Cl.
| | |
|---|---|
| *G01S 17/00* | (2020.01) |
| *B60W 10/20* | (2006.01) |
| *B60W 40/02* | (2006.01) |
| *G01S 17/95* | (2006.01) |

(52) U.S. Cl.
CPC .......... *G01S 17/95* (2013.01); *B60W 10/20* (2013.01); *B60W 40/02* (2013.01); *B60W 2420/403* (2013.01); *B60W 2420/408* (2024.01); *B60W 2555/20* (2020.02)

(58) Field of Classification Search
USPC .......................................... 356/28
See application file for complete search history.

(56) References Cited

U.S. PATENT DOCUMENTS

| | | | | |
|---|---|---|---|---|
| 7,471,995 B1 * | 12/2008 | Robinson | ............. | G08G 5/0021 340/901 |
| 9,933,351 B2 * | 4/2018 | Kent | ................. | G01N 15/1434 |
| 10,228,696 B2 * | 3/2019 | Myers | ............... | G08G 1/096855 |
| 11,400,940 B2 * | 8/2022 | Neubecker | ............. | G06V 20/58 |
| 11,760,348 B2 * | 9/2023 | Verma | .................. | B62D 15/025 701/41 |
| 2014/0300888 A1 * | 10/2014 | Duffey | .................... | G01S 7/497 356/28 |
| 2016/0290912 A1 | 10/2016 | Kent et al. | | |
| 2018/0210447 A1 | 7/2018 | Myers et al. | | |
| 2018/0224859 A1 * | 8/2018 | Brudner | .................. | G01W 1/02 |
| 2020/0247307 A1 * | 8/2020 | Tsutsumi | ................ | B60R 11/04 |
| 2020/0284883 A1 * | 9/2020 | Ferreira | ................ | G01S 7/4811 |

(Continued)

FOREIGN PATENT DOCUMENTS

DE 102018221265 A1 6/2020

OTHER PUBLICATIONS

J. R. V. Rivero, T. Gerbich, B. Buschardt and J. Chen, "The Effect of Spray Water on an Automotive LIDAR Sensor: A Real-Time Simulation Study," in IEEE Transactions on Intelligent Vehicles, vol. 7, No. 1, pp. 57-72, Mar. 2022, (Year: 2022).*

(Continued)

*Primary Examiner* — James R Hulka
(74) *Attorney, Agent, or Firm* — Michael T. Gabrik; Frank D. Cimino

(57) ABSTRACT

This disclosure relates to wind detection and vehicle control. In an example, sensor data can be generated by one or more wind sensing devices for a vehicle that includes at least one light detection and ranging (LIDAR) device. The sensor data can characterize a movement of airborne particles. Wind characteristics can be determined based on the sensor data. A vehicle operating parameter can be updated based on the determined wind characteristics.

20 Claims, 4 Drawing Sheets

(56) References Cited

U.S. PATENT DOCUMENTS

2022/0097713 A1* 3/2022 Neubecker ............ B60W 40/02
2023/0095407 A1* 3/2023 Verma ................... B60W 40/02
                                                            701/41

OTHER PUBLICATIONS

Wu J, Xu H, Tian Y, Pi R, Yue R. Vehicle Detection under Adverse Weather from Roadside LIDAR Data. Sensors (Basel). Jun. 17, 2020 (Year: 2020).*
W. K. Zhao, S. J. Zhao, Y. L. Shan and X. J. Sun, "Numerical Simulation for Wind Shear Detection With a Glide Path Scanning Algorithm Based on Wind LiDAR," in IEEE Sensors Journal, vol. 21, No. 18, pp. 20248-20257, 15 Sep. 15, 2021, (Year: 2021).*
PCT International Search Report, PCT/US 2021/060928; mail date: Feb. 24, 2022, 2pages.

* cited by examiner

WIND DETECTION SYSTEM AND VEHICLE CONTROL

TECHNICAL FIELD

This disclosure relates to wind detection and vehicle control. More particularly, this disclosure relates to wind prediction and vehicle control for mitigating impacts of dangerous winds on a vehicle.

BACKGROUND

Automobiles, trucks, and other vehicles can be used to transport people, cargo, and objects. Vehicles, including autonomous vehicles, during operation, may experience road conditions that may put the vehicle and in some instances their occupants, at risk. For example, during high wind conditions, cross-winds and wind shear can push a vehicle off a road, into another vehicle in an adjacent lane, or cause the vehicle to overturn.

SUMMARY

This disclosure relates to wind detection and vehicle control.

In an example, a method can include receiving sensor data generated by at least one light detection and ranging (LIDAR) device for a vehicle. The sensor data can characterize a movement of airborne particles. The method can include determining wind characteristics based on the sensor data and updating a vehicle operating parameter based on the determined wind characteristics.

In another example, a system can include a wind sensor system for a vehicle that can include at least one LIDAR device and at least one radio detection and ranging (RADAR) device. The system can include a controller that can include a memory storing machine readable instructions for adjusting a vehicle operating parameter. The machine readable instructions can be executed to receive laser data generated by the at least one LIDAR device and receive radar data generated by the at least one RADAR device. The laser data can characterize a movement of airborne particles. The radar data can characterize the movement of the airborne particles. The machine readable instructions can further be executed to determine wind characteristics based on the laser data, the radar data, and cause the vehicle operating parameter to be updated based on the determined wind characteristics.

In a further example, a method can include receiving laser data generated by at least one LIDAR device for a vehicle, radar data generated by at least one RADAR device for the vehicle, and image data generated by at least one camera device for the vehicle. The laser, radar, and image data can characterize a movement of airborne particles. The method can include computing an average wind speed and average wind direction based on the laser data, the radar data, and the image data and causing a vehicle operating parameter to be updated based on the computed average wind speed and the computed average wind direction. The vehicle operating parameter can include one of a speed of the vehicle and a steering angle of a steering system of the vehicle.

DETAILED DESCRIPTION

Figure 1:
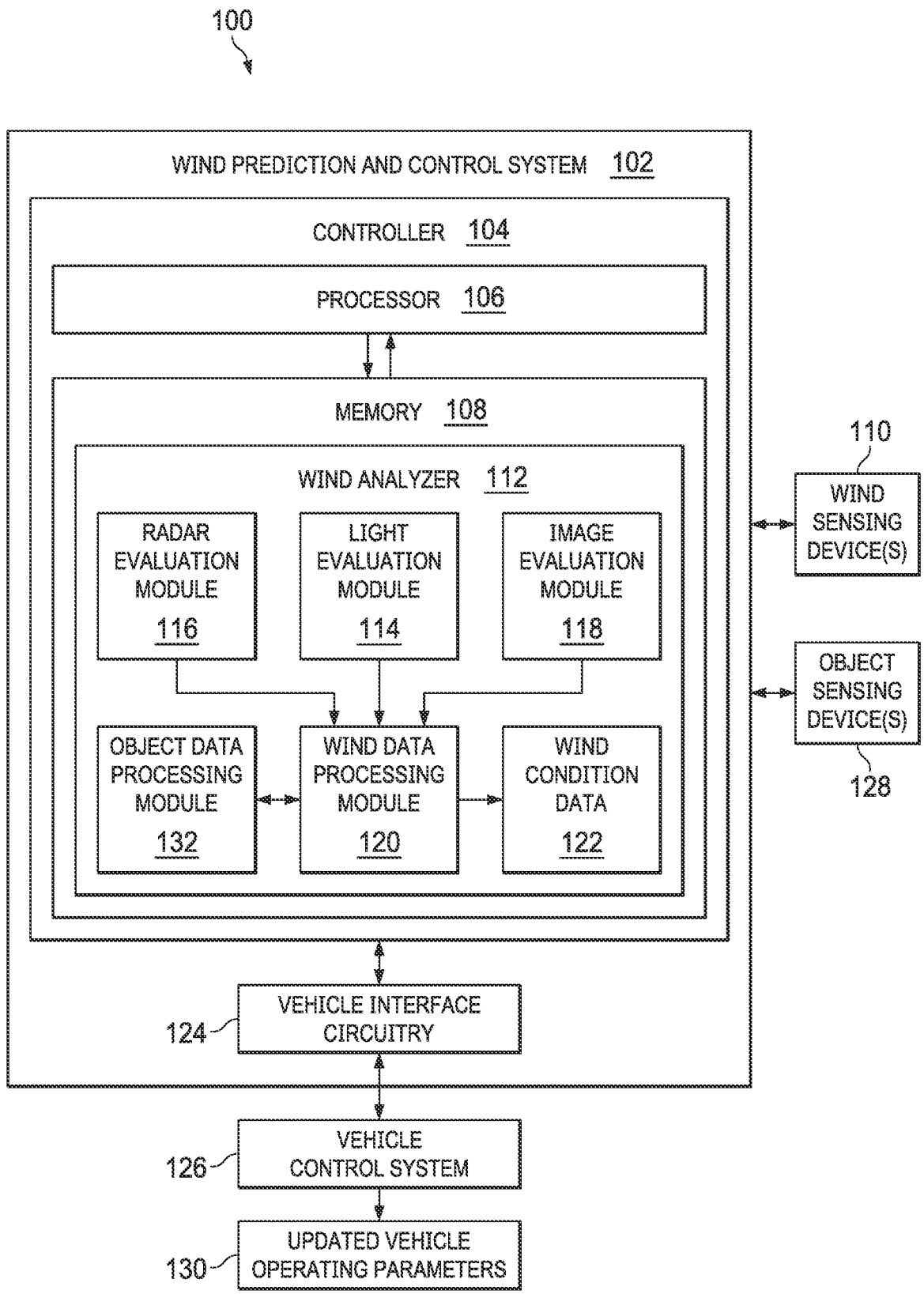
FIG. 1 illustrates an example of a wind prediction and control (WPC) system.

This disclosure relates to wind detection and vehicle control. During dangerous wind conditions, a vehicle can be pushed off course, which can put the vehicle and/or vehicle occupants at risk. In some situations, drivers may not have sufficient reaction time to minimize the impact of danger winds acting on the vehicle. Moreover, vehicle control during dangerous wind conditions is difficult to maintain as wind force may continuously change during such weather situations. Vehicles currently are configured with wind-speed sensors to measure wind forces as these forces are acting on a vehicle. For example, wind measurement data from these sensors can be provided to an electronic stability program (ESP) for compensation to counteract wind forces. In some instances, vehicles are configured to make appropriate vehicle corrections in response to vehicle sensors detecting a shift in a vehicles course (e.g., travel trajectory) in response to the wind. As such, current wind force compensations techniques are reactive and compensate for wind forces once these forces have acted on the vehicle.

System and methods are described herein for early detection of dangerous winds by predicting dangerous wind conditions. The term "dangerous" as used herein in relation to wind refers to a movement of gas particles in an atmosphere that produces a wind force that can cause a vehicle to be pushed off a vehicle trajectory. The movement of the gas particles can be caused by a spatial difference in atmospheric pressure in the atmosphere. Thus, wind can be created when the gas particles move from areas in the atmosphere of high pressure toward areas in the atmosphere of low pressure. The movement of the air particles from high to low pressure areas can result in a wind force with a wind speed that can push a vehicle of a current vehicle path. By detecting dangerous winds before wind forces created by such atmospheric conditions act upon the vehicle, vehicle control commands can be generated to control an action of the vehicle to mitigate an impact of the wind forces on the vehicle. Accordingly, the systems and methods described herein can detect dangerous wind conditions before the vehicle experiences such conditions and cause the vehicle to act proactively to mitigate the impact of wind forces produced by the dangerous wind conditions. The systems and methods described herein can control the action of the vehicle, such that the vehicle substantially maintains a current vehicle path. While many examples herein are described in a context of ground vehicles, it is to be understood that the approaches disclosed herein are equally applicable to other vehicles, such as aerial vehicles and watercraft vehicles, which can include manned or unmanned vehicles.

In some examples, a WPC system is configured to receive sensor data generated by one or more wind sensing devices. The sensor data can characterize a movement of airborne particles at a location in an atmosphere. The airborne particles can be caused to move in response to a wind force of a wind produced by gas particle movement in the atmosphere. The one or more wind sensing devices can include at least one LIDAR device, at least one RADAR device, and/or at least one camera device. Thus, in some examples, the WPC system is configured to receive laser data, radar data, and/or image data, each of which can characterize the movement of the airborne particles at the location in the atmosphere in a respective sensor domain. The WPC system can be configured to determine a wind speed and a wind direction of the wind based on the sensor data. In some examples, the WPC system is configured to compute an average wind speed and average wind direction of the wind based on the laser data, the radar data, and/or the image data.

The WPC system is configured to provide wind condition data that includes the determined wind speed and wind direction of the wind. In some examples, the wind condition data includes the average wind speed and the average wind direction of the wind. The wind condition data can be employed by a vehicle control system to update one or more vehicle operating parameters of a vehicle to mitigate an impact of the wind on the vehicle. The one or more vehicle operating parameters can include a speed of the vehicle and a steering angle of a steering system of the vehicle. In some examples, the WPC system is configured to determine a distance between the airborne particles at the location and the vehicle at another location in the atmosphere. The determined distance can be used in the updating of the one or more vehicle operating parameters to mitigate the impact of the wind on the vehicle. Accordingly, the WPC system can be configured to detect the wind force of the wind before the wind force of the wind act upon the vehicle, and update vehicle operating parameters, such as configure the speed and/or steering angle, to mitigate the impact of the wind on the vehicle.

FIG. 1 illustrates an example 100 of a WPC system 102. In some examples, the WPC system 102 can be employed in an electronic system of a vehicle. The WPC system 102 can be configured to detect a wind force of a wind before the vehicle experiences the detected wind force and cause the vehicle to adjust one or more vehicle operating parameters to compensate for the detected wind force. The WPC system 102 can be configured to dynamically cause the vehicle to adjust vehicle operations based on predicted wind conditions. The WPC system 102 can include a controller 104.

The controller 104 includes at least one processor 106 (e.g., a central processing unit (CPU)) and a memory 108. By way of example, the CPU can be a complex instruction set computer (CISC)-type CPU, reduced instruction set computer (RISC)-type CPU, microcontroller unit (MCU), or digital signal processor (DSP). The memory 108 can include random access memory (RAM)). In additional examples, the memory 108 includes other types of memories (e.g., on-processor cache, off-processor cache, RAM, flash memory, or disk storage). The memory 108 can include coded instructions (e.g., computer and/or machine readable instructions) that can be representative of a wind prediction and vehicle control application that can be executed by the processor 106 to implement at least some of the functions described herein.

In some examples, the processor 106 is configured to execute the application to predict (e.g., detect) the wind force of the wind in a future (e.g., at a distance from the vehicle) before the wind force impacts the vehicle, and compute wind condition data for adjusting the one or more vehicle operations of the vehicle. When moving air (e.g., wind) is stopped by the vehicle a dynamic energy of the wind (e.g., gas particles) is transformed to a pressure, which acts on the vehicle to push the vehicle. If the wind force of the wind has enough energy, the wind force can push the vehicle off a current vehicle path. In some examples, the wind is caused by a naturally occurring event (e.g., a storm or a tornado).

In some examples, one or more wind sensing devices 110 can be employed to detect the wind force of the wind at a location in an atmosphere by detecting a movement of airborne particles in response to the wind force of the wind. The airborne particles can be at a distance from the vehicle, which can be at another location. Because the airborne particles are moved in response to the wind force of the wind, the wind force of the wind can be at the distance of the vehicle. The airborne particles can be of any size and have any shape. The term "airborne particles" as used herein can include dust, water, snow, rain, aerosols, dirt, trash, objects, insects, or particles that may be moved in response to the wind force produced by the wind. The one or more wind sensing devices 110 can be mounted on the vehicle. In some examples, a mounting mechanism is used to adjust the one or more wind sensing devices 110 to direct the one or more wind sensing devices 110 in a desired direction (e.g., toward a side of the vehicle). For example, the WPC system 102 is configured to direct the one or more wind sensing devices 110 in the desired direction based on weather data for a geographical location in which the vehicle is located or is to be located to enable the one or more wind sensing devices 110 to detect the movement of the airborne particles in response to the wind. In other examples, weather sensors on the vehicle can be used to provide wind sensor control information for directing the one or more wind sensing devices 110 in the desired direction. Although the example of FIG. 1 illustrates the one or more wind sensing devices 110 as separate from the WPC system 102, in other examples, the WPC system 102 can include one or more wind sensing devices 110.

In some examples, the one or more wind sensing devices 110 are configured to provide sensor data to the controller 104. The sensor data can characterize the movement of airborne particles at the location in the atmosphere in response to the wind force of the wind. The movement of the airborne particles at the location can be analyzed to compute a wind speed and a wind direction of the wind force of the wind based on the sensor data, as described herein. The controller 104 can employ a wind analyzer 112 to analyze the sensor data for vehicle control as described herein. In some examples, the one or more wind sensing devices 110 include a LIDAR device. The LIDAR device can include one or more LIDAR sensors (e.g., laser scanners) that can be configured to emit laser pulses at the airborne particles at the location and detect a portion of the emitted laser pulses as back-scattered light as the emitted laser pulses interact with the airborne particles being acted on by the wind force of the wind.

A number of laser pulses emitted by the one or more LIDAR sensors and thus a sampling rate can be defined by LIDAR configuration data, which may be provided by the WPC system 102. For example, during heavy rain or snow conditions, the number of pulses is adjusted based on the LIDAR configuration data to increase the sampling rate of the LIDAR device. In some examples, a geometry of such pulses (e.g., 2D scanning, 3D scanning, or a combination thereof) is defined by the LIDAR configuration data. In some examples, the LIDAR device is configured to detect the movement of the airborne particles at the location based on a determined detection range, which can be provided as part of the LIDAR configuration data. As such, the LIDAR device can be configured to detect winds at different distances from the vehicle. A detection range of the LIDAR device can be set (e.g., adjusted) based on factors of the LIDAR configuration data such as a speed of the vehicle, type of vehicle, weather conditions (e.g., heavy rain and/or snow conditions), and/or terrain conditions.

The processor 106 can be configured to receive the back-scattered light detected by the LIDAR module as laser data. The sensor data can include the laser data. The wind analyzer 112 can be programmed to analyze the laser data to determine the wind speed and the wind direction of the wind force, and thus the wind. For example, the wind analyzer 112 is programmed to employ a light evaluation module 114 to evaluate the movement of the airborne particles over time to determine the wind speed and the wind direction of the wind. In some examples, the light evaluation module 114 can be programmed to calculate the wind speed and the wind direction with respect to a longitudinal axis of the vehicle. For example, the light evaluation module 114 is programmed to determine the wind speed and direction in three-dimensions (e.g., X, Y, and Z) relative to a position of the one or more LIDAR sensors, thereby the vehicle.

In some examples, the light evaluation module 114 is programmed to determine a distance between the location of the RADAR device and the location of the airborne particles being acted upon by wind force of the wind in the atmosphere. Because the RADAR device is mounted on the vehicle, the distance between the airborne particles at the location and the RADAR device at the other location can be representative of the distance between the vehicle and the wind force of the wind. Moreover, because a speed of light is a known constant, a time that elapses between an emitted laser pulse by the one or more LIDAR sensors and a corresponding return can be used by the light evaluation module 114 to calculate the distance between the vehicle and the wind. The light evaluation module 114 can be programmed to provide the wind speed of the wind, the wind direction of the wind, and/or the distance between the vehicle and the wind as a first set of wind data, which can be stored in the memory 108. While the example of FIG. 1 illustrates the light evaluation module 114 being implemented in the memory 108, in other examples, the light evaluation module 114 can be implemented on the LIDAR device.

In some examples, the one or more wind sensing devices 110 include a RADAR device. In some examples, the RADAR device is a Pulse-Doppler radar. The RADAR device can be configured to emit a radar signal (e.g., one or more electromagnetic (EM) waves) toward the airborne particles at the location. The airborne particles can change a frequency of the radar signal and reflect the radar signal back toward the one or more radar systems as a reflected radar signal. The RADAR device can be configured to provide radar data characterizing the emitted radar signal and the reflected radar signal to the controller 104. The wind analyzer 112 can employ a radar evaluation module 116 to evaluate the radar data to determine the wind speed and the wind direction of the wind force of the wind, and the distance between the vehicle and the wind force of the wind. For example, the radar evaluation module 116 can be programmed to analyze a strength of the reflected radar signal, a time it took to travel to the airborne particles at the location and back to the RADAR device, and a frequency shift of the radar signal to determine the wind speed and the wind direction of the wind force of the wind, and the distance between the wind force of the wind and the LADAR device based on the radar data. Because the LADAR device is mounted on the vehicle, the distance between the airborne particles at the location and the LADAR device at the other location can be representative of the distance between the vehicle and the wind force of the wind.

The radar evaluation module 116 can be programmed to provide the wind speed of the wind force of the wind, the wind direction of the wind force of the wind, and/or the distance between the vehicle and the wind force of the wind as a second set of wind data. The second set of wind data can be stored in the memory 108. While the example of FIG. 1 illustrates the radar evaluation module 116 being implemented in the memory 108, in other examples, the radar evaluation module 116 can be implemented on the one or more radar systems.

In some examples, the one or more wind sensing devices 110 includes at least one camera device. During weather conditions that result in rain or snow, the at least one camera device can be configured to capture images of the airborne particles (e.g., precipitation) to detect the movement of the airborne particles in response to the wind force of the wind. The at least one camera device can be configured to provide image data characterizing the movement of the airborne particles in response to the wind force of the wind to the controller 104. The wind analyzer 112 can employ an image evaluation module 118 to evaluate the image data to determine the wind speed and the wind direction of the wind force of the wind. The image evaluation module 118 can be programmed to communicate with the camera device to receive the image data. The image evaluation module 118 can be programmed to provide the wind speed and the wind direction of the wind force of the wind as a third set of wind data based on the evaluation of the image data.

In some examples, the image evaluation module 118 is programmed to evaluate the image data to determine the distance between the camera and the wind force of the wind. For example, the image evaluation module 118 can be programmed to evaluate visual information (e.g., light intensity) from the images and camera properties for the at least one camera to determine a distance between the at least one camera and the airborne particles and thus the wind force of the wind. In other examples, a set of cameras can be employed to capture images of the movement of the airborne particles to provide the image data. The set of cameras can define a stereo camera, in some examples. The evaluation module 118 can be programmed to evaluate the visual information from the images, location information for the set of cameras, camera properties of each of the set of cameras to determine the distance between the set of cameras and the airborne particles. Because the at least one camera device, or in some examples, the set of cameras, is mounted on the vehicle, the distance between the airborne particles at the location and the LADAR device at the other location can be representative of the distance between the vehicle and the wind force of the wind. The determined distance between the vehicle and the wind force of the wind by the image evaluation module 118 can be stored as part of the third set of wind data, which can be stored in the memory 108. While the example of FIG. 1 illustrates the image evaluation module 118 being implemented in the memory 108, in other examples, the image evaluation module 118 can be implemented on the one or more camera systems.

In some examples, during snow and/or rain conditions, the LIDAR device can be configured to emit laser pulses at the airborne particles at the location to detect the movement of the airborne particles in response to the wind force of the wind. As the emitted laser pulses travel toward the airborne particles, the precipitation which is being acted upon by the wind force of the wind can cause portions of each emitted laser pulse to be back-scattered. Each back-scattered portion of each emitted laser pulse can have different time of flight information. The LIDAR device can be configured to provide each back-scattered portion of each emitted laser pulse as respective laser data to the controller 104. The light evaluation module 114 can be programmed to determine the time of flight information for each back-scattered portion of each emitted laser pulse, for example, by determining an amount of time between a time at which the emitted laser pulses were transmitted and each portion of each emitted laser pulse that was back-scattered was received by the LIDAR device.

The light evaluation module 114 can be programmed to compare the time of flight information for each back-scattered portion of each emitted laser pulse to determine which back-scattered portion of a respective emitted laser pulse has a greatest time of flight information. In some examples, the light evaluation module 114 can be programmed to compare the time of flight information for each back-scattered portion to a threshold to exclude back-scattered portions of emitted laser pulses that are reflected by precipitation between the LIDAR device and the airborne particles and thus are not being acted upon by the wind force of the wind. The light evaluation module 114 can be programmed to employ the time of flight information determined to be the greatest to determine the distance between the airborne particles and the vehicle. The light evaluation module 114 can be programmed to provide the determined distance between the wind force of the wind and the vehicle determined during snow and/or rain conditions as part of the first set of wind data. Accordingly, during rainy and/or snow conditions, the LIDAR device can be configured to determine the distance between the wind and the vehicle.

In some examples, the wind analyzer 112 includes a wind data processing module 120. The wind data processing module 120 can be programmed to receive each of the first, second, and third sets of wind data and process each set of wind data to provide wind condition data 122. For example, the wind data processing module 120 is programmed to evaluate the wind speed from each set of wind data to determine an average wind speed for the wind force of the wind. By way of example, the wind data processing module 120 is programmed to compute a mean wind speed or a median wind speed based on the wind speed from each set of wind data. In another embodiment, the wind data processing module 120 can be programmed to process the wind speed by applying a weighted function to the first, second, and third sets of wind data. Wind data processing module 120 may use a myriad of mathematical equations to determine a wind speed.

In some examples, the wind data processing module 120 is programmed to evaluate the wind direction from each set of wind data to determine an average wind direction for the wind force of the wind. The wind data processing module 120 can be programmed to compute a mean direction speed or a median direction speed based on the wind direction from each set of wind data. In some examples, the wind data processing module 120 can be programmed to evaluate the distance between the vehicle and the airborne particles from each set of wind data to determine a corresponding distance between the vehicle and the airborne particles. The wind data processing module 120 can be programmed to compute a mean or a median distance between the airborne particle at the location and the vehicle at the other location based on each set of wind data. Thus, the wind data processing module 120 can be programmed to compute the distance between the wind force of the wind and the vehicle based on each set of wind data.

The wind data processing module 120 can be programmed to store in the memory 108 the average wind speed for the wind, the average wind direction for the wind, and the corresponding distance between the vehicle and the wind force of the wind as or part of the wind condition data 122. The wind data processing module 120 can be programmed to provide the wind condition data 122 to vehicle interface circuitry 124. The vehicle interface circuitry 124 can include a bus controller to perform communication through a bus (e.g., a local area network (LAN) bus) with a vehicle control system 126. The communication of data between the vehicle interface circuitry 124 and the vehicle control system 126 can use a controller area network (CAN) protocol.

In some examples, the wind data processing module 120 is programmed to employ one of the first set of wind data, the second set of wind data, and/or the third set of wind data to be provided as the wind condition data 122 to the vehicle interface circuitry 124 based on weather conditions. For example, during rainy and snow conditions, the wind data processing module 120 is programmed to provide the second set of data as the wind condition data 122. In some examples, during clear conditions, the wind data processing module 120 is programmed to provide the first set of data as the wind condition data 122. In further examples, the wind data processing module 120 is programmed to provide a portion of data from one set of wind data and a portion of data from another set of wind data as the wind condition data 122 to the vehicle interface circuitry 124 based on the weather conditions. For example, during weather conditions that result in rain and/or snow, the wind data processing module 120 can be programmed to employ the wind speed and the wind direction computed by the image evaluation module 118 from the third set of wind data and the distance between the vehicle and the wind force of the vehicle from one of the first set of wind data and the second set of wind data to provide the wind condition data 122 to the vehicle interface circuitry 124.

The vehicle interface circuitry 124 can be configured to communicate the wind condition data 122 to the vehicle control system 126. In some examples, the vehicle control system 126 includes an electronic stability program (ESP). The vehicle control system 126 can be configured to process the wind condition data 122 to compute one or more updated vehicle operating parameters 130 for adjusting a vehicle operation of the vehicle. In some examples, the vehicle control system 126 can employ a data fusion module that can be programmed to fuse data from multiple systems, including the one or more wind sensing devices 110 and one or more object sensing devices 128, data sources on the vehicle, and other sources (e.g., on the vehicle or at a remote location) to compute the one or more updated vehicle operating parameters 130 for the vehicle. Thus, the data fusion module can be programmed to fuse the wind condition data 122 with other vehicle data to compute the one or more updated vehicle operating parameters 130. For example, the data fusion module can be programmed to merge the wind condition data 122 with vehicle data, such as an actual vehicle position, speed, and/or steering angle to calculate expected forces with respect to the vehicle, and update the vehicle operating parameters based on the calculated expected forces.

By way of example, the other vehicle data includes global positioning system (GPS) data for the vehicle, map data of a current geographical location in which the vehicle is located or is to be located, weather data, accelerometer data for the vehicle, gyroscope data for the vehicle, and/or the like. In some examples, the accelerometer and/or the gyroscope data may be used by the vehicle control system 126 to predict a pitch and a yaw movement for the vehicle during the impact of the wind on the vehicle. The vehicle control system 126 can be configured to employ the predicted pitch and yaw movement to compute one or more updated vehicle operating parameters 130 for adjusting the operation of the vehicle.

In some examples, the one or more updated vehicle operating parameters 130 include an updated speed for the vehicle and/or updated steering angle for a steering system of the vehicle. The vehicle control system 126 can be configured to employ the one or more updated vehicle parameters 130 to cause one or more vehicle sub-systems (e.g., speed control system and a steering system) of the vehicle to adjust a current speed and/or steering angle of the steering system to the updated vehicle speed and/or steering angle, such that the vehicle compensates for the wind in response to the wind impacting the vehicle. Thus, the vehicle control system 126 can be configured to adjust vehicle operations to minimize the impact of the wind on the vehicle.

In some examples, the vehicle control system 126 can communicate the updated steering angle to the steering system of the vehicle. The steering system can include a steering angle controller. The steering angle controller can be configured to adjust a steering angle of each wheel of the vehicle based on the updated steering angle. In some examples, the steering angle controller can be configured to adjust the steering angle of each wheel of the vehicle to maintain a current vehicle trajectory of the vehicle based on the updated steering angle. In some examples, the vehicle control system 126 can communicate the updated speed for the vehicle to the speed control system. The speed control system can adjust the vehicle speed of the vehicle based on the updated speed. For example, the speed control system can adjust an engine torque of the vehicle, such that a present speed of the vehicle can be caused to approach the updated speed. In some examples, the speed control system can adjust the present speed of the vehicle by changing a frequency of an alternating current (AC) being outputted by a direct-current (DC) to AC converter to an electrical motor of the vehicle. By adjusting the steering angle of each wheel of the vehicle and/or the speed of the vehicles based on the updated steering angle and/or updated speed for the vehicle, the vehicle can be configured to mitigate the impact of the wind force of the wind on the vehicle as the wind force of the wind acts (e.g., pushes) upon the vehicle. The vehicle mitigates the impact of the wind force by maintaining the current vehicle trajectory.

In some examples, the WPC system 102 is configured to communicate with the one or more object sensing devices 128. The one or more object sensing devices 128 can be configured to detect objects (e.g., vehicles, road hazards, and the like) that may be within a distance (e.g., vicinity) of the vehicle as the vehicles moves along the current vehicle trajectory. The one or more object sensing devices 128 can include one or more camera systems, one or more RADAR systems, and/or LIDAR systems for detecting objects. In some examples, the one or more object sensing devices 128 is mounted on the vehicle to monitor one or more sides of the vehicle.

The one or more object sensing devices 128 can be configured to generate object data characterizing one or more detected objects. The object data can be provided to the controller 104. The controller 104 can employ an object data processing module 132. The object data processing module 132 can be programmed to update the one or more vehicle operating parameters of the vehicle with respect to the wind based on the object data. In some examples, the object data is indicative of a type of object. In other examples, the object data processing module 132 is programmed to process the object data (e.g., one or more images of the object) to determine the type of object detected by the one or more objecting sensing devices 128.

In some examples, the wind is a cross-wind. The cross-wind can be perpendicular to the vehicle path of the vehicle. In other examples, the cross-wind has a wind angle relative to the vehicle path that is less than 90 degrees but greater than 0 degrees. As the vehicle is moving along the current vehicle trajectory (e.g., in a respective vehicle lane), the object may block a wind path of the wind as the wind approaches the vehicle, thus shield the vehicle from the cross-wind. The object data processing module 132 can be programmed to communicate via the vehicle interface circuitry 124 with the vehicle control system 126 to adjust the one or more vehicle operating parameters, such as the speed of the vehicle and/or the steering angle as described herein in response to determining that the vehicle is shielded from the cross-wind by the object. Thus, the object data processing module 132 can be programmed to cause the vehicle control system 126 to compute new vehicle operating parameters to adjust the updated speed and/or steering angle of the vehicle to the new speed and/or steering angle in response to determining that the vehicle is shielded from the wind by the object.

By way of example, the object data processing module 132 is programmed to evaluate wind data (e.g., one of the first set of wind data, the second set of wind data, and the third set of wind data) to determine whether the vehicle is shielded from the wind force of the wind by the object. In some examples, the object data processing module 132 can be programmed to evaluate the object data to detect an object (e.g., a rock) in the wind. The object data processing module 132 can be programmed to determine a trajectory of the object relative to the vehicle based on the wind data. The wind data processing module 120 can be programmed to communicate the determined trajectory to the vehicle control system 126 for adjusting the steering angle and/or speed of the vehicle.

In some examples, the object data processing module 132 can be programmed to communicate with the wind data processing module 120 to receive the wind data, and compare the wind data to a wind threshold to determine whether the vehicle is shielded by the object from the wind. For example, the object data processing module 132 is programmed to determine that the vehicle is shielded from the wind by the object in response to determining that the wind speed of the wind data is less than or equal to the wind threshold for a defined period of time (e.g., for about two seconds). The wind threshold can be representative of a value for determining whether the vehicle is shielded by the object. In other examples, a different approach can be used to determine whether the vehicle is shielded by the object from the wind. In some examples, the wind threshold can be adaptive.

In some examples, the object data processing module 132 is programmed to determine that the vehicle is no longer being shielded by the object, for example, in response to determining that the wind speed of the wind data is greater than the wind threshold for the defined period of time. The object data processing module 132 can be programmed to communicate an indication to the wind data processing module 120 that the object is no longer shielding the vehicle to cause the wind data processing module 120 to provided updated wind condition data for vehicle control. The wind data processing module 120 can be programmed to generate the updated wind condition data in a same or similar manner as described herein. The updated wind condition data can be provided to the vehicle control system 126 to provide the one or more updated vehicle operating parameters 130 for updated vehicle control.

Accordingly, by employing the WPC system 102 on the vehicle allows for early detection of winds by predicting a future wind before the future wind is experienced by the vehicle. By detecting winds before the winds impacts the vehicle, vehicle control commands can be generated to control an action of the vehicle that mitigates the impact of the winds on the vehicle. Thus, the WPC system 102 can be configured to predict dangerous winds and enable the vehicle to act proactively to mitigate the impact of dangerous winds on the vehicle.

Figure 2:
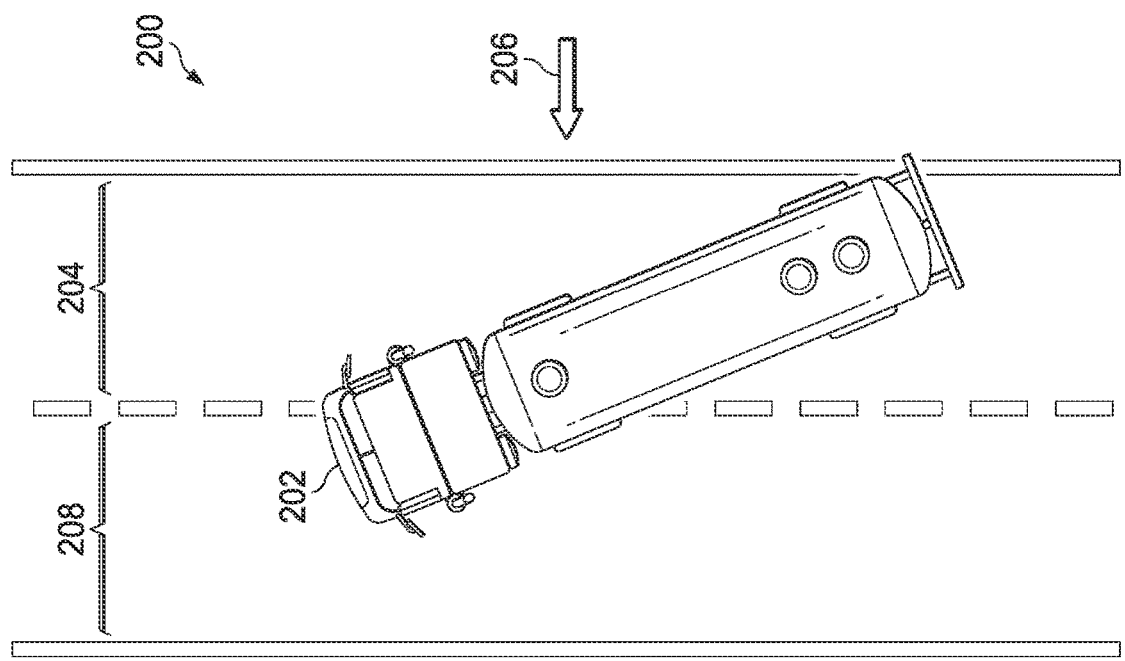
FIG. 2 illustrates an example of a scenario in which a vehicle is not configured with a WPC system.

FIG. 2 illustrates an example of a scenario 200 in which a vehicle 202 is not configured with a WPC system, such as the WPC system 102, as illustrated in FIG. 1. In the example of FIG. 2, the vehicle 202 can be controlled (e.g., by a human, autonomously, or semi-autonomously) to move the vehicle 202 in a lane 204 in a respective direction. During a dangerous wind condition, a wind 206 can occur that can impact the movement of the vehicle 202, such as to cause the vehicle 202 to be pushed into a nearby-lane 208, as illustrated in FIG. 2. If another vehicle (not shown in FIG. 2) is moving in the nearby-lane 208, for example, in a same direction as the vehicle 202 or an opposite direction can result in an accident, which may cause damage to the vehicle 202 or the other vehicle, or in some situations, lead to a loss of life.

Figure 3:
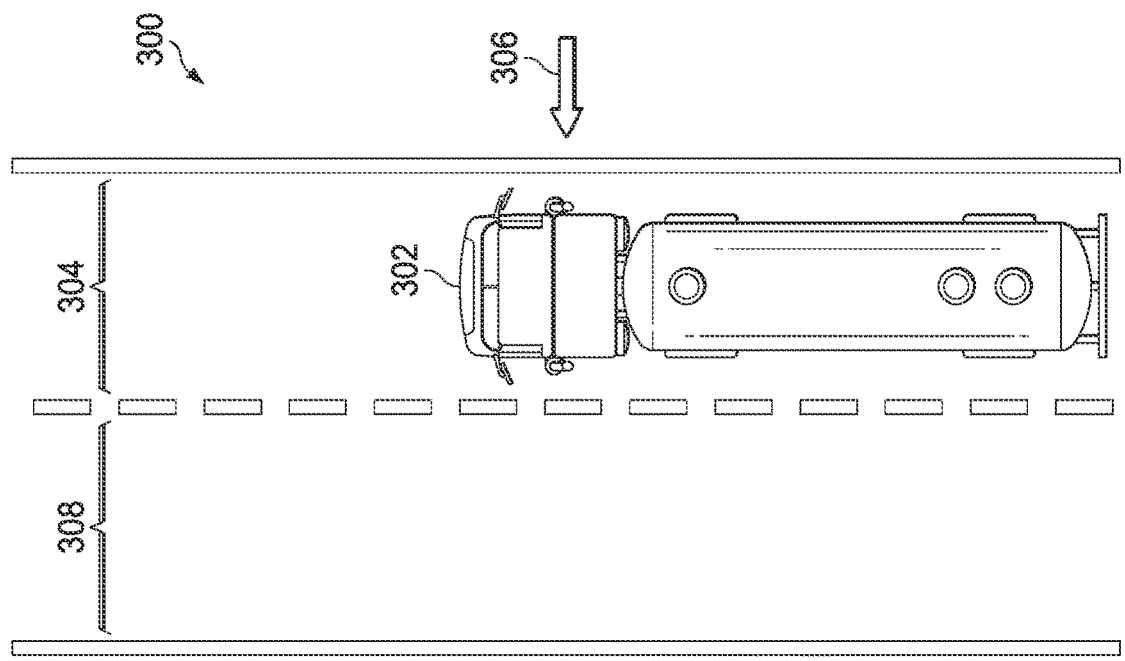
FIG. 3 illustrates an example of a scenario in which a vehicle is configured with a WPC system.

FIG. 3 illustrates an example of a scenario 300 in which a vehicle is configured with a WPC system, such as the WPC system 102, as illustrated in FIG. 1. Therefore, in some examples, reference can be made to the example of FIG. 1 in the following description of the example of FIG. 3. In the example of FIG. 3, the vehicle 302 can be controlled (e.g., by a human, autonomously, or semi-autonomously) to move the vehicle 302 in a lane 304 in a respective direction. During a dangerous wind condition, a wind gust 306 can occur that can impact the movement of the vehicle 302. However, because the vehicle 302 is configured with the WPC system as described herein, the WPC system can detect a wind force of the wind 306 before the vehicle 302 experiences the wind force of the wind 306. The WPC system can be configured to generate wind condition data for adjusting one or more vehicle operations of the vehicle, such that the affects of the wind force of the wind 306 on the vehicle are mitigated or reduced. For example, the WPC system can be configured to cause a vehicle control system to adjust a speed of the vehicle 302 and/or a steering of the vehicle to compensate for the wind force of the wind 306 based on the vehicle control data. The WPC system can be configured to cause the vehicle control system (e.g., the vehicle control system 126, as illustrated in FIG. 1) to compensate for the wind force of the wind 306, such that the vehicle maintains a current vehicle path in response to the wind force of the wind 306 acting on the vehicle 302. Accordingly, the WPC system can enable the vehicle 302, in some examples, to stay within the lane 304 and not move into a near-by lane 308, which may increase a likelihood that the vehicle collides with an object (e.g., another vehicle).

Figure 4:
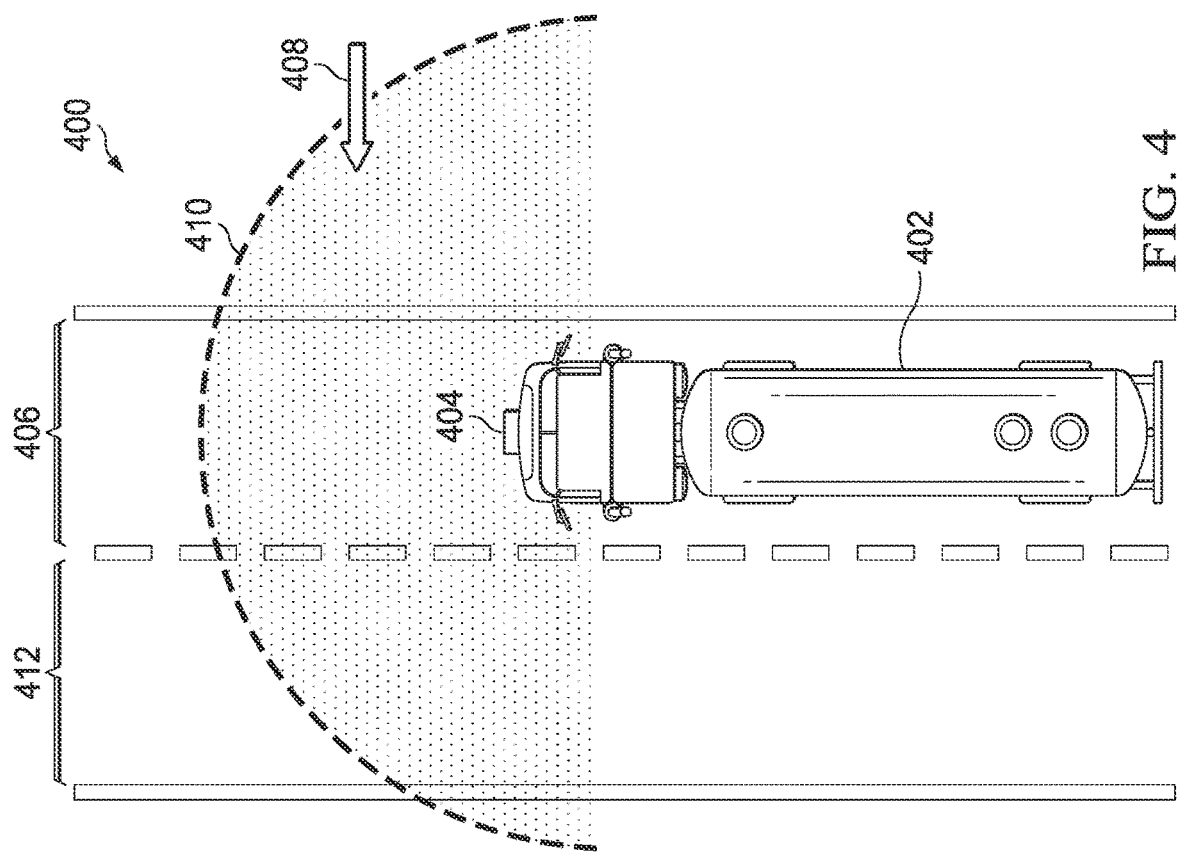
FIG. 4 illustrates an example of a vehicle configured with a LIDAR system for providing sensor data for processing by a WPC system for wind prediction and vehicle control.

FIG. 4 illustrates an example of a scenario 400 with a vehicle 402 configured with a LIDAR device 404 for providing sensor data for processing by a WPC system for wind prediction and vehicle control. The WPC system can correspond to the WPC system 102, as illustrated in FIG. 1. Therefore, in some examples, reference can be made to the example of FIG. 1 in the following description of the example of FIG. 4. In the example of FIG. 4, the vehicle 402 can be controlled (e.g., by a human, autonomously, or semi-autonomously) to move the vehicle 402 in a lane 406 in a respective direction. During a dangerous wind condition, a wind 408 can occur that can impact the movement the vehicle 402. As illustrated in FIG. 4, the vehicle 402 is configured with the LIDAR device 404.

In some examples, the LIDAR device 404 can correspond to one of the one or more wind sensing devices 110, as illustrated in FIG. 1. Although in the example of FIG. 4 the LIDAR device 404 is located at a front-end of the vehicle 402, in other examples, the LIDAR device 404 can be located at another location on the vehicle 402, such as on a side of the vehicle 402. While the example of FIG. 4 illustrates a single LIDAR device 404, in other examples, a plurality of LIDAR devices may be employed and positioned on the vehicle to provide a comprehensive (e.g., a 360 degree) LIDAR detection system. The comprehensive LIDAR detection system can be configured to detect movement of airborne particles in response to a wind force of the wind 408 from any angle with respect to the vehicle 402 before the wind force of the wind 408 can be experienced by the vehicle. In response to detecting the movement of the airborne particles, the LIDAR device 404 can be configured to provide sensor data for processing by the WPC system to determine a wind speed and a direction of the wind force of the wind 408 as described herein.

In some examples, the LIDAR device 404 can be configured to detect wind conditions at a detection range 410. By way of example, the LIDAR device 404 can be configured to adjust the detection range 410, such as based on LIDAR configuration data, which can be provided by the WPC system. In some examples, the detection range 410 can be about 50 meters. By configuring the LIDAR device 404 to detect the movement of the airborne particles in response to the wind force of the wind 408 at a distance away from the vehicle 402, can enable the WPC system to compensate for the wind force 408, such that the vehicle maintains a current vehicle path or stays within the lane 406 and does not move into a neighboring lane 412. For example, if the WPC system determines that the wind 408 has a wind speed of about 27.8 meters per second (m/s), and the set range 410 for the LIDAR device 404 is 50 meters, a reaction time for the vehicle 402 is 1.8 seconds. Thus, the WPC system has about 1.8 seconds to predict the wind speed and the direction of the wind 408 and cause the vehicle 402 to compensate for the wind 408 within the reaction time. Accordingly, by configuring the vehicle 402 with the WPC system, the wind 408 (e.g., side winds) can be anticipated by the vehicle 402 and vehicle controls (e.g., speed and/or steering) can be adjusted to compensate for the wind 408 as the wind 408 impacts the vehicle 402.

Figure 5:
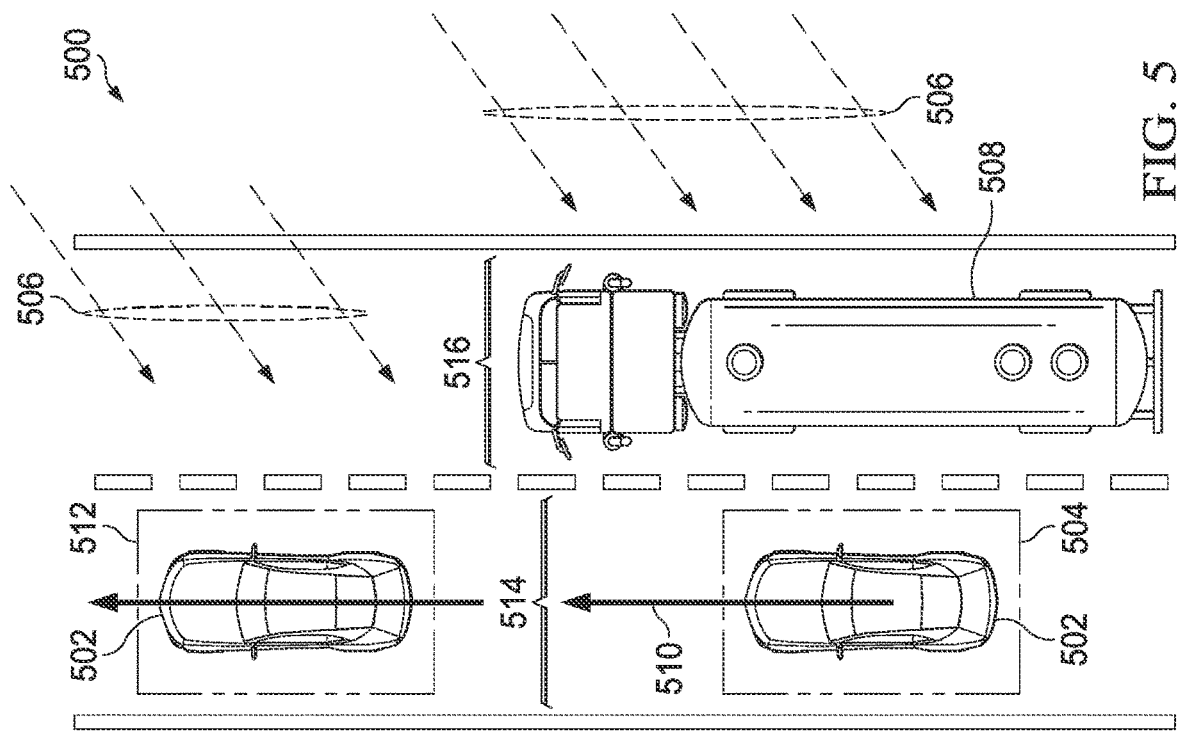
FIG. 5 illustrates an example of another scenario in which a vehicle is configured with a WPC system.

FIG. 5 illustrates another example of a scenario 500 in which a first vehicle 502 is configured with a WPC system. The WPC system can correspond to the WPC system 102, as illustrated in FIG. 1. Therefore, in some examples, reference can be made to the example of FIG. 1 in the following description of the example of FIG. 5. In the example of FIG. 5, in a first vehicle state 504, the first vehicle 502 is shield from a wind force of a wind 506 by a second vehicle 508 until the first vehicle 502 moves along a path 510 into a second vehicle state 512. The first vehicle 502 can be moving in a forward direction along the path 510 in a first lane 514 at a greater speed than the second vehicle 508 that is moving in a similar direction in a second lane 516.

In some examples, the first vehicle 502 is configured with a LIDAR device, a camera device, and/or a RADAR device. The LIDAR device, the camera device, and/or the RADAR device can correspond to the one or more object sensing devices 128, as illustrated in FIG. 1. In some examples, the LIDAR device, the camera device, and/or the RADAR device can be employed to detect the second vehicle 508. The LIDAR device, the camera device, and/or the RADAR device can be employed to detect the second vehicle 508 as the first vehicle 502 passes-up the second vehicle 508. The WPC system can be configured to sense the wind force of the wind 506 before the wind force of the wind 506 is experienced by the first vehicle 502 in response to the LIDAR device, the camera device, and/or the RADAR device not detecting the second vehicle 508. A wind detection system (e.g., the one or more wind sensing devices 110, as illustrated in FIG. 1) can be mounted on the first vehicle 502 and configured to provide sensor data for processing by the WPC system to determine a wind speed and a direction of the wind gust 506 as described herein.

The WPC system can be configured to generate wind condition data (e.g., the wind condition data 122, as illustrated in FIG. 1) characterizing the wind speed and the direction of the wind force of the wind 506. The WPC system can be configured to cause a vehicle control system (e.g., the vehicle control system 126, as illustrated in FIG. 1) to adjust a speed of the vehicle 302 and/or a steering angle of a steering system of the vehicle to compensate for the wind force of the wind 306 based on the wind condition data. The WPC system can be configured to cause the vehicle control system to compensate for the wind force of the wind 306, such that the first vehicle 502 maintains a current vehicle path. Thus, the WPC system can cause the first vehicle 502, in some examples, to stay within the first lane 514 and not move into the second lane 516 in response to the wind force of the wind 506 impacting the first vehicle 502.

In some examples, the vehicle control system causes the first vehicle 502 to reduce a current speed, such that the first vehicle 502 moves from the second vehicle state 512 to the first vehicle state 504, and thereby shield the first vehicle 502 from the wind force of the wind 506. In other examples, a speed of the second vehicle 508 is increased such that the second vehicle 508 shields the first vehicle 502 from the wind force of the wind 506. The WPC system can be configured to detect that the second vehicle 508 is shielding the first vehicle 502 from the wind force of the wind 506 and cause the vehicle control system to stop compensating for the wind force of the wind 506. Thus, in some examples, the WPC system is configured to cause the vehicle control system to revert to a new or previous vehicle control state (e.g., previous speed and/or steering angle) for the first vehicle 502. Accordingly, the WPC system can be configured to dynamically adjust vehicle operations of the first vehicle 502 with respect to the wind force of the wind 506 as the first vehicle 502 moves in and out of being shielded from the wind force of the wind 506 by the second vehicle 508.

Figure 6:
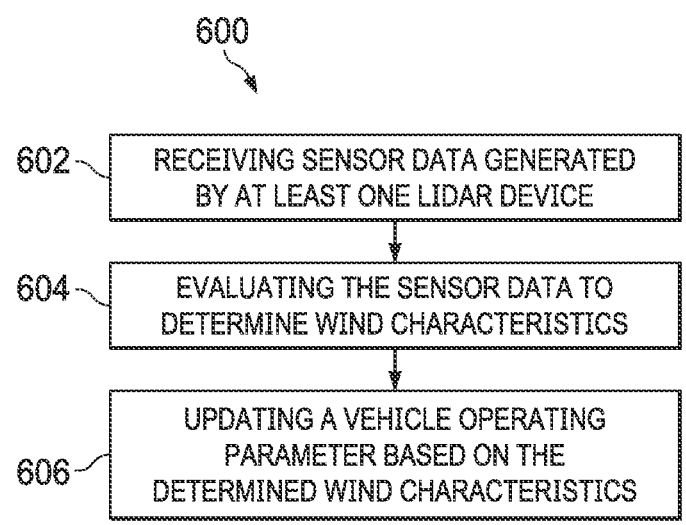
FIG. 6 illustrates an example of a method for maneuvering a vehicle with respect to a danger wind condition.

In view of the foregoing structural and functional features described above, an example method will be better appreciated with references to FIG. 6. While, for purposes of simplicity of explanation, the example method of FIG. 6 is shown and described as executing serially, it is to be understood and appreciated that the example method is not limited by the illustrated order, as some actions could in other examples occur in different orders, multiple times and/or concurrently from that shown and described herein.

FIG. 6 illustrates an example of a method 600 for maneuvering a vehicle (e.g., the first vehicle 502, as illustrated in FIG. 5) with respect to wind (e.g., the wind 506, as illustrated in FIG. 5). The method 600 can be implemented by the WPC system 102, as illustrated in FIG. 1. Therefore, in some examples, reference can be made to the example of FIGS. 3-5 in the following description of the example of FIG. 6. The method 600 can begin at 602 by receiving sensor data generated by at least one LIDAR device (e.g., the one or more wind sensing devices 110, as illustrated in FIG. 1). The sensor data can be received by the WPC system 102. The sensor data can characterize a movement of airborne particles in response to a wind force of a wind at a location in an atmosphere that is at a distance from the vehicle. At 604, the sensor data can be evaluated (e.g., by a wind analyzer 112, as illustrated in FIG. 1) to determine wind characteristics (e.g., a wind speed and a wind direction) of the wind based on the sensor data. For example, backscattered light detected characterized by the sensor data can be analyzed (e.g., by the light evaluation module 114, as illustrated in FIG. 1) to determine the wind speed and the wind direction of the wind. In some examples, a distance between the at least one LIDAR device mounted on the vehicle and a location of the airborne particles being acted upon by the wind force of the wind in the atmosphere can be computed (e.g., by the light evaluation module 114, as illustrated in FIG. 1) based on the sensor data.

At 606, one or more vehicle operating parameters can be updated (e.g., by the vehicle control system 126, as shown in FIG. 1) based on the wind characteristics of the wind to mitigate the impact of the wind on the vehicle. The one or more vehicle operating parameters can include an updated steering angle and an updated vehicle speed. For example, the vehicle control system 126 can be configured to cause a steering system of the vehicle to adjust steering angles of wheels of the vehicle based on the updated steering angle of the one or more vehicle operating parameters. In some examples, the vehicle control system 126 can be configured to cause a speed control system of the vehicle to adjust a current speed of the vehicle based on the updated vehicle speed. By adjusting the steering angle and the vehicle speed of the vehicle base on the updated steering angle and the updated vehicle speed the vehicle can be configured to mitigate the impact of the wind force of the wind on the vehicle as the wind force of the wind acts (e.g., pushes) upon the vehicle.

As used herein, the term "circuit" can include a collection of active and/or passive elements that perform a circuit function, such as an analog circuit and/or digital circuit. Additionally or alternatively, for example, the term "circuit" can include an integrated circuit (IC) where all or some of the circuit elements are fabricated on a common substrate (e.g., semiconductor substrate, such as a die or chip) or within a common package herein. Additionally, the term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B, such that device B is controlled by device A via the control signal generated by device A.

In this description and the claims, the term "based on" means based at least in part on.

Modifications are possible in the described embodiments, and other embodiments are possible, within the scope of the claims.

What is claimed is:

1. A method comprising:
   receiving sensor data generated by at least one sensing device for a vehicle, wherein the sensor data characterizes a movement of airborne particles;
   determining wind characteristics including a wind path and a wind force based on the sensor data;
   detecting an object moving relative to the vehicle, determining a trajectory of the object, and determining a time period during which the object will be positioned to shield at least a portion of the vehicle from the wind force; and
   adjusting a vehicle operating parameter based on the determined wind characteristics, the determined trajectory of the object, and the determined time period.

2. The method of claim 1, wherein the at least one sensing device includes a light detection and ranging (LIDAR) device from which the sensor data is received, a radio detection and ranging (RADAR) device, and a camera device, the method further comprising receiving additional sensor data generated by the RADAR device and the camera device, wherein the additional sensor data characterizes the movement of the airborne particles, wherein the wind characteristics are determined based on the analysis of the sensor data and the additional sensor data.

3. The method of claim 2, wherein the determining of the wind characteristics comprises processing the sensor data and the additional sensor data to determine an average wind speed and an average wind direction, and wherein the vehicle operating parameter is updated based on the average wind speed and the average wind direction.

4. The method of claim 1, wherein the wind characteristics comprise a wind direction that is aligned with the wind path and a wind speed, the method further comprising determining a distance between a subset of the airborne particles remote from the vehicle and the vehicle based on the sensor data, the updating of the vehicle operating parameter is further based on the determined distance.

5. The method of claim 4, wherein:

the sensor data is generated by a light detection and ranging (LIDAR) device, the wind speed is a first wind speed, the wind direction is a first wind direction, and the distance is a first distance, the first wind speed, the first wind direction, and the first distance are stored in memory as a first set of wind data, and the method further comprising receiving radar data generated by at least one radio detection and ranging (RADAR) device for the vehicle, wherein the radar data characterizes the movement of the airborne particles, and and the determining of the wind characteristics comprises:

determining a second wind speed, a second wind direction, and a second distance between the vehicle and the subset of the airborne particles based on an analysis of the radar data; and storing in the memory the second wind speed, the second wind direction, and the second distance between the vehicle and the wind as a second set of wind data; and wherein the vehicle operating parameter is updated based on the analysis of the first set of wind data and the second set of wind data.

6. The method of claim 5, wherein the vehicle operating parameter is updated based on a subset of data from the first set of wind data and a subset of data from the second set of wind data.

7. The method of claim 5, wherein the determining of the wind characteristics comprises processing the first set of wind data and the second set of wind data to determine an average wind speed, an average wind direction, and an average distance between the vehicle and the subset of the airborne particles, wherein the vehicle operating parameter is updated based on the average wind speed, the average wind direction, and the average distance between the vehicle and the wind.

8. The method of claim 7, further comprising generating image data comprising a set of images generated by a camera device for the vehicle, wherein the image data characterizes the movement of the airborne particles, and the determining of the wind characteristics comprises:

determining a third wind speed, a third wind direction, and a third distance between the vehicle and the subset of the airborne particles based on an analysis of the image data; and storing in the memory the third wind speed, the third wind direction, and the third distance between the vehicle and the airborne particles as a third set of wind data, and wherein the vehicle operating parameter are updated based on the analysis of the first set of wind data, the second set of wind data, and the third set of data.

9. The method of claim 8, wherein the vehicle operating parameter is updated based on a subset of data from the first set of wind data and a subset of data from one of the second set of wind data and the third set of wind data.

10. The method of claim 9, wherein the processing comprises determining the average wind speed, the average wind direction, and the average distance between the vehicle and the subset of the airborne particles based on the first set of wind data, the second set of wind data, and the third set of data.

11. The method of claim 10, further comprising transmitting to a vehicle control system wind condition data that includes the average wind speed, the average wind direction, and the average distance between the vehicle and the subset of the airborne particles, the vehicle control system being configured to update the vehicle operating parameter based on the wind condition data, the vehicle control system comprising an electronic stability program for updating the vehicle operating parameter based on the condition data, the vehicle operating parameter comprising a speed of the vehicle and a steering angle of a steering system of the vehicle.

12. The method of claim 11, wherein the object is detected by an object sensing device for the vehicle.

13. The method of claim 12, further comprising directing the LIDAR device, the camera device, and the radar device in a direction based on weather data.

14. A system comprising:

a sensor system for a vehicle comprising at least one sensing device;

a controller comprising a memory storing machine readable instructions for causing a vehicle operating parameter to be adjusted, the machine readable instructions, when executed, cause the system to:
receive sensor data generated by the at least one sensor device, wherein the sensor data characterizes a movement of airborne particles;
determine wind characteristics including a wind path and a wind force based on the sensor data;
detecting an object moving relative to the vehicle, determining a trajectory of the object, and determining a time period during which the object will be positioned to shield at least a portion of the vehicle from the wind force;
cause the vehicle operating parameter to be adjusted based on the determined wind characteristics, the determined trajectory of the object, and the determined time period.

15. The system of claim 14, wherein the at least one sensing device includes at least one of a light detection and ranging (LIDAR) device and a radio detection and ranging (RADAR) device, wherein the machine readable instructions are further executed to receive image data generated by at least one camera device for the vehicle, wherein the image data characterizes the movement of the airborne particles, wherein the wind characteristics are further determined based on an analysis of the image data.

16. The system of claim 15, wherein the machine readable instructions are further executed to determine a distance between a subset of the airborne particles remote from the vehicle and the vehicle based on the analysis of the laser data, the radar data, and the image data, and the vehicle operating parameter is further caused to be updated based on the determined distance between the airborne particles and the vehicle.

17. The system of claim 16, further comprising at least one object sensing device for detecting the object.

18. The system of claim 16, the machine readable instructions are further executed to cause the wind characteristics to be transmitted as wind condition data to a vehicle control system comprising an electronic stability program for updating the vehicle operating parameter, the vehicle operating parameter comprising a speed of the vehicle and a steering angle of a steering system of the vehicle.

19. A method comprising:
receiving at least one of laser data, radar data, and image data that characterizes a movement of airborne particles and that is generated by a sensing system for a vehicle;
computing an average wind speed and average wind direction based on the at least one of the laser data, the radar data, and the image data, the average wind direction aligned with a wind path;
detecting an object moving relative to the vehicle, determining a trajectory of the object, and determining a time period during which the object will be positioned to at least partially block a wind generated force from impinging on the vehicle; and
causing a vehicle operating parameter to be adjusted based on the computed average wind speed, the computed average wind direction, the determined trajectory of the object, and the determined time period, wherein the vehicle operating parameter includes one of a speed of the vehicle and a steering angle of a steering system of the vehicle.

20. The method of claim 19, wherein the receiving includes receiving the laser data, the radar data, and the image data, wherein the laser data is generated by a light detection and ranging (LIDAR) device of the sensing system, the radar data is generated by a radar device of the sensing system, and the image data is generated by a camera of the sensing system.

* * * * *